(12) United States Patent
Platt

(10) Patent No.: US 12,121,110 B2
(45) Date of Patent: Oct. 22, 2024

(54) LACE TYING DEVICE

(71) Applicant: Noam Platt, New Orleans, LA (US)

(72) Inventor: Noam Platt, New Orleans, LA (US)

(*) Notice: Subject to any disclaimer, the term of this patent is extended or adjusted under 35 U.S.C. 154(b) by 0 days.

(21) Appl. No.: 18/422,724

(22) Filed: Jan. 25, 2024

(65) Prior Publication Data

US 2024/0245170 A1     Jul. 25, 2024

Related U.S. Application Data

(60) Provisional application No. 63/481,404, filed on Jan. 25, 2023.

(51) Int. Cl.
*F16G 11/00* (2006.01)
*A43C 7/00* (2006.01)
*F16G 11/04* (2006.01)

(52) U.S. Cl.
CPC .............. *A43C 7/00* (2013.01); *F16G 11/046* (2013.01); *Y10T 24/3918* (2015.01)

(58) Field of Classification Search
CPC ...... F16G 11/04; F16G 11/044; F16G 11/046; F16G 11/14; Y10T 24/3916; Y10T 24/3918; Y10T 24/3996; Y10T 24/3711; Y10T 24/3724; A43C 7/00
See application file for complete search history.

(56) References Cited

U.S. PATENT DOCUMENTS

| | | | | |
|---|---|---|---|---|
| 294,240 A | * | 2/1884 | Judd | A01G 17/06 256/48 |
| 329,071 A | * | 10/1885 | Palmer | F16G 11/00 24/129 R |
| 828,765 A | * | 8/1906 | Nilsson | F16G 11/10 24/130 |
| 912,387 A | * | 2/1909 | Landry | F16G 11/103 54/24 |
| 1,348,475 A | * | 8/1920 | Bullock, Jr. | A43C 7/00 24/712.9 |
| 1,466,495 A | * | 8/1923 | Watson | F16G 11/10 24/129 R |
| 1,586,174 A | * | 5/1926 | Bell | F16G 11/12 24/910 |
| 1,663,182 A | * | 3/1928 | Semmler | F16G 11/12 24/910 |
| 2,329,389 A | * | 9/1943 | Bullum | F16G 11/14 24/129 R |
| 2,418,885 A | * | 4/1947 | Houston | F16G 11/14 24/129 B |
| 4,178,661 A | * | 12/1979 | Klein | F16G 11/103 24/130 |
| 5,245,729 A | * | 9/1993 | Greff | F16G 11/046 24/130 |

(Continued)

*Primary Examiner* — Robert Sandy
*Assistant Examiner* — Michael S Lee
(74) *Attorney, Agent, or Firm* — Intellectual Property Consulting, LLC; Mark N. Melasky

(57) ABSTRACT

A lace tying device is provided. The devices includes a base having a proximal end opposite a distal end. A first vertical section is disposed at the proximate end of the base. An aperture is defined by the first vertical section. A tie bar is connected to the first vertical section. A second vertical section is disposed at the distal end of the base. The second vertical section defines a retention notch. An anchor member is disposed at the distal end of the base.

20 Claims, 8 Drawing Sheets

(56) References Cited

U.S. PATENT DOCUMENTS

| | | | | |
|---|---|---|---|---|
| 5,809,618 | A | * | 9/1998 | Perhacs ................ A44B 11/065 24/910 |
| 6,763,776 | B1 | * | 7/2004 | Perri ....................... B63B 21/08 24/129 R |
| 2006/0054070 | A1 | * | 3/2006 | Lopes Praca ........... B63B 21/08 114/218 |
| 2006/0168772 | A1 | * | 8/2006 | Sorensen ................ F16G 11/14 24/130 |
| 2008/0016659 | A1 | * | 1/2008 | Peterson .............. F16G 11/046 24/599.1 |
| 2010/0160957 | A1 | * | 6/2010 | Kirkham ............ A61B 17/1322 24/115 J |
| 2012/0137475 | A1 | * | 6/2012 | Seader .................... A43C 7/00 24/129 R |
| 2017/0020235 | A1 | * | 1/2017 | Beitzel ................... B63B 21/08 |

\* cited by examiner though here, may be arranged and designed in a wide variety of different configurations.

LACE TYING DEVICE

CROSS-REFERENCE TO RELATED APPLICATIONS

This application claims priority to of U.S. Provisional Patent Application Ser. No. 63/481,404 filed Jan. 25, 2023, the entirety of which is incorporated by reference as if fully disclosed herein.

BACKGROUND OF THE INVENTION

Field of the Invention

The present invention relates generally to a device for affixing and controlling the placement and tension of fastening devices, such as laces, on footwear and clothing. More particularly, the invention relates to a device that is capable of retaining tension in the fasteners, while allowing one handed operation of the fastening system on footwear or clothing.

General Background

The tightening of footwear and clothing articles is made especially difficult by users who lack the full use of both hands. This creates a difficulty of use of common clothing and footwear for a large number of individuals who are unable to manipulate shoelaces and other conventional fasteners to tighten footwear and clothing. Conventional clothing and footwear assume the users to be fully able bodied with full dexterity. Full use of both hands is required to tighten shoelaces and other clothing fasteners. Many people do not have full use of both hands and are therefore unable to independently wear conventional footwear or clothing. Therefore, a need exists in the field for a novel device to tighten and affix the common fasteners found on footwear and clothing using minimal effort and utilizing one hand.

SUMMARY OF THE INVENTION

In accordance with embodiments of the invention, a lace tying device is provided. The lace tying device includes a base having a proximal end opposite a distal end. A first vertical section is disposed at the proximate end of the base. A lace retention portion is defined by the first vertical section. A tie bar is connected to the first vertical section. A second vertical section is disposed at the distal end of the base. The second vertical section defines a retention notch.

In another embodiment, the lace tying device includes a base having a proximal end opposite a distal end. A first vertical section is disposed at the proximate end of the base. An aperture is defined by the first vertical section. A tie bar is connected to the first vertical section. A second vertical section is disposed at the distal end of the base. The second vertical section defines a retention notch. An anchor member is disposed at the distal end of the base.

In yet another embodiment, the lace tying device includes a base having a proximal end opposite a distal end. A first vertical section is disposed at the proximate end of the base. A tie bar is connected to the first vertical section. A second vertical section is disposed at the distal end of the base. The second vertical section defines a retention notch.

In one embodiment, the lace tying device includes a base having a proximal end opposite a distal end. A first vertical section is disposed at the proximate end of the base. An aperture is defined by the first vertical section. A tie bar is connected to the first vertical section. A second vertical section is disposed at the distal end of the base. A retention notch is defined by the second vertical section. The retention notch has an opening.

In yet another embodiment, the lace tying device includes a base having a proximal end opposite a distal end. A first vertical section is disposed at the proximate end of the base. The first lace retention portion is defined by the first vertical section. The tie bar is connected to the first vertical section. The second vertical section is disposed at the distal end of the base. The second lace retention portion is defined by the second vertical section.

In another embodiment, the lace tying device has a base having a proximal end opposite a distal end. A first vertical tie bar section is disposed at the proximate end of the base. A second vertical tie bar is disposed at the distal end of the base. A lace retention portion is disposed at said distal end of said base.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

Figure 1:
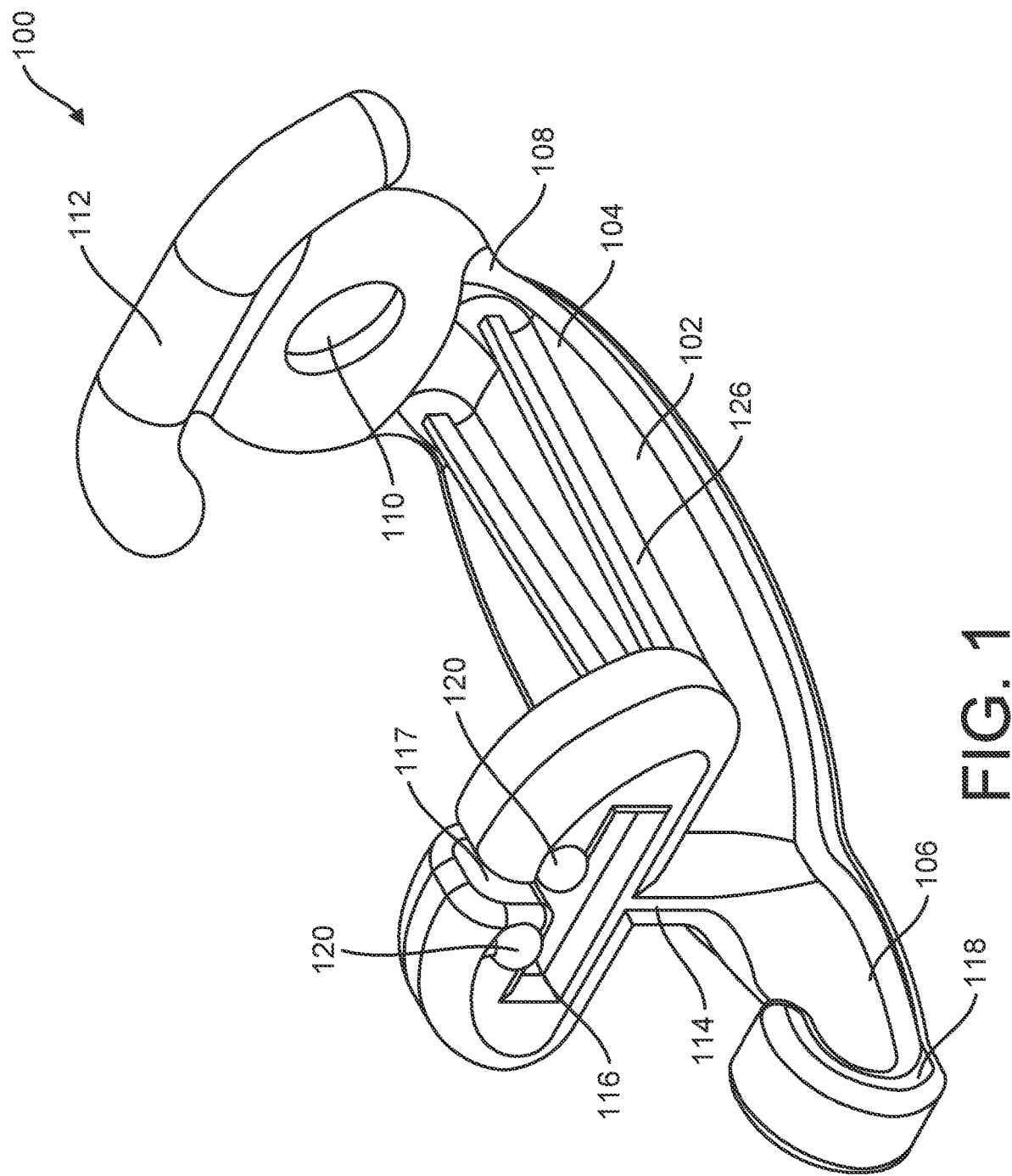
FIG. 1 depicts a perspective view of a lace tying device in accordance with embodiments of the invention.
Figure 2:
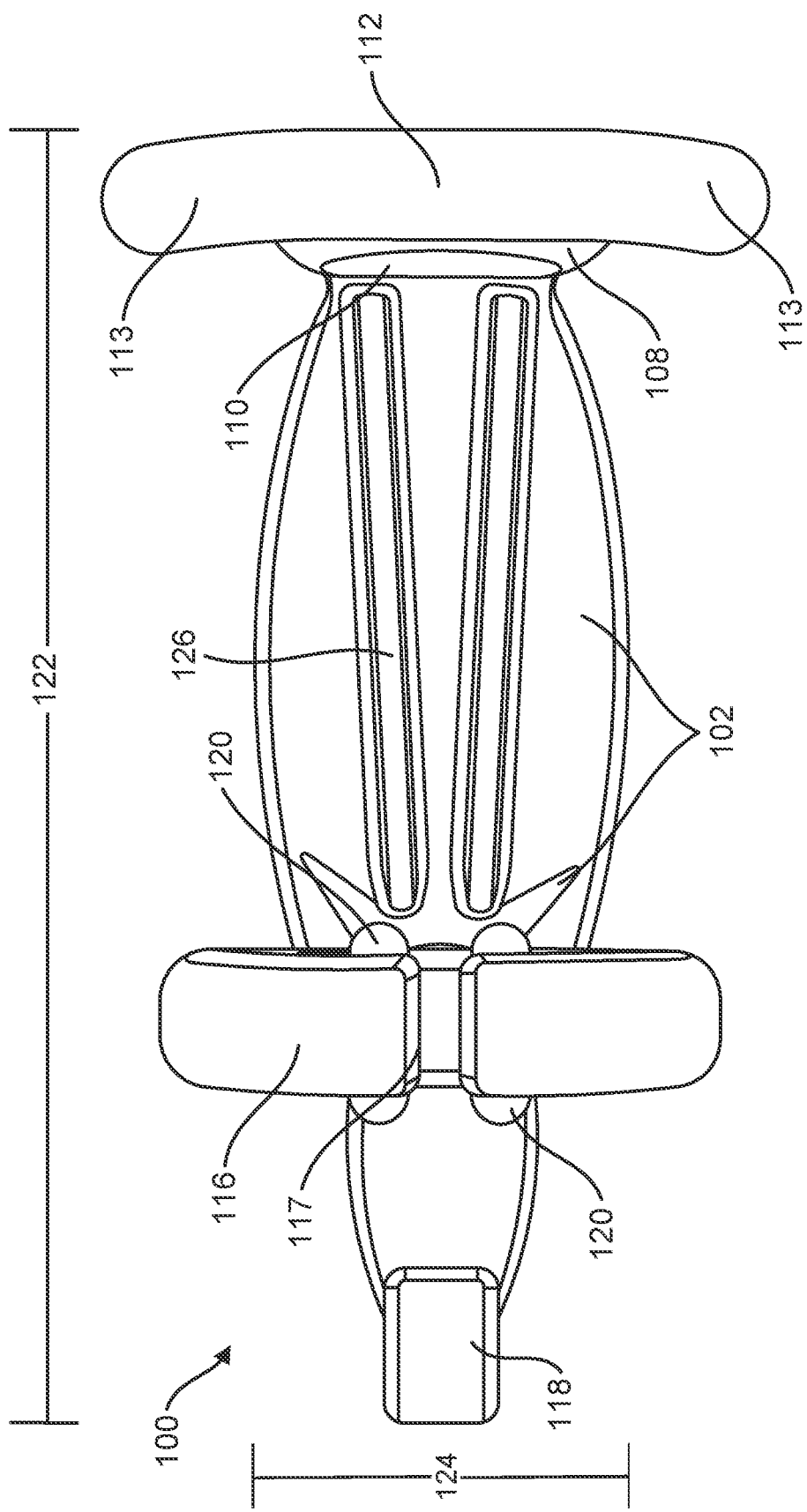
FIG. 2 depicts a top view of a lace tying device in accordance with embodiments of the invention.
Figure 3:
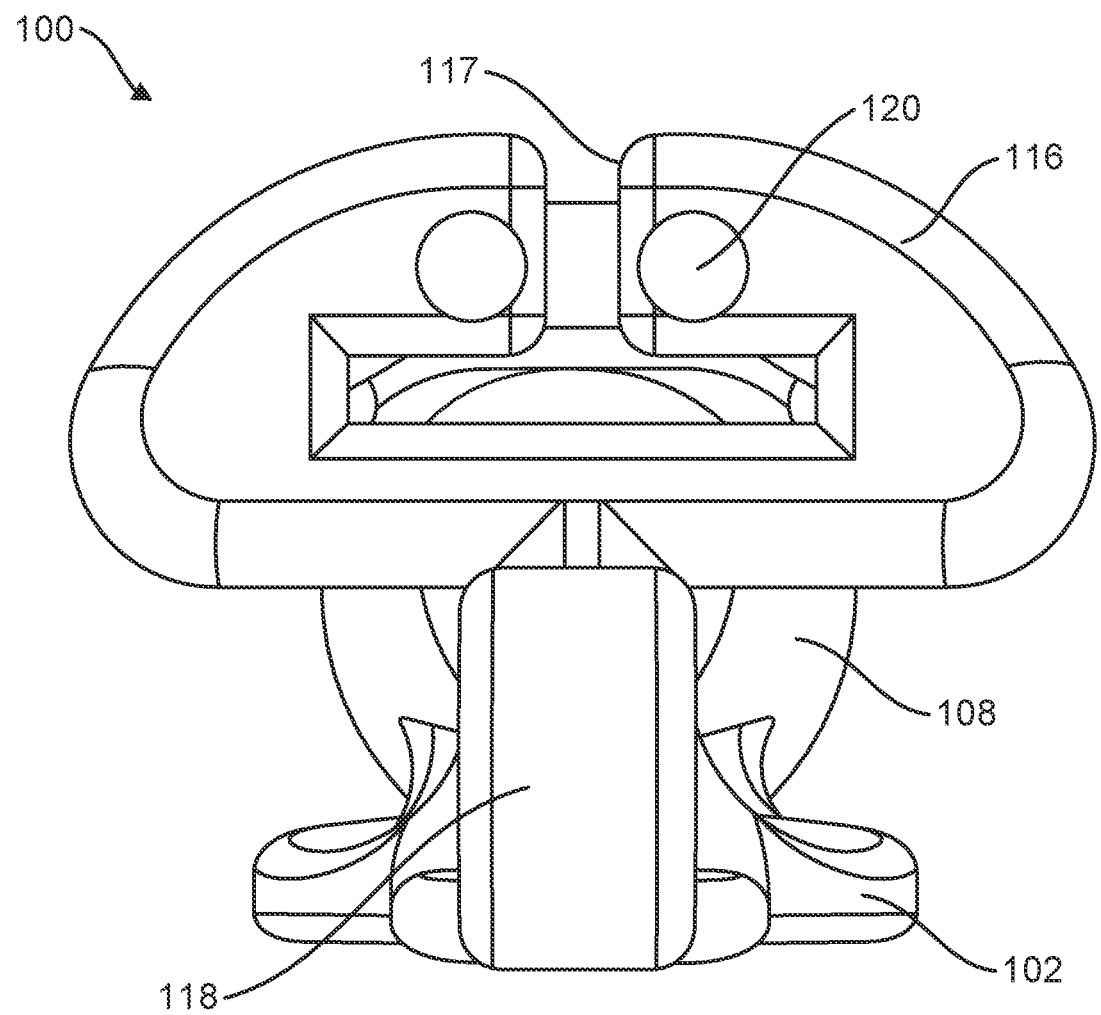
FIG. 3 depicts a front view of a lace tying device in accordance with embodiments of the invention.
Figure 4:
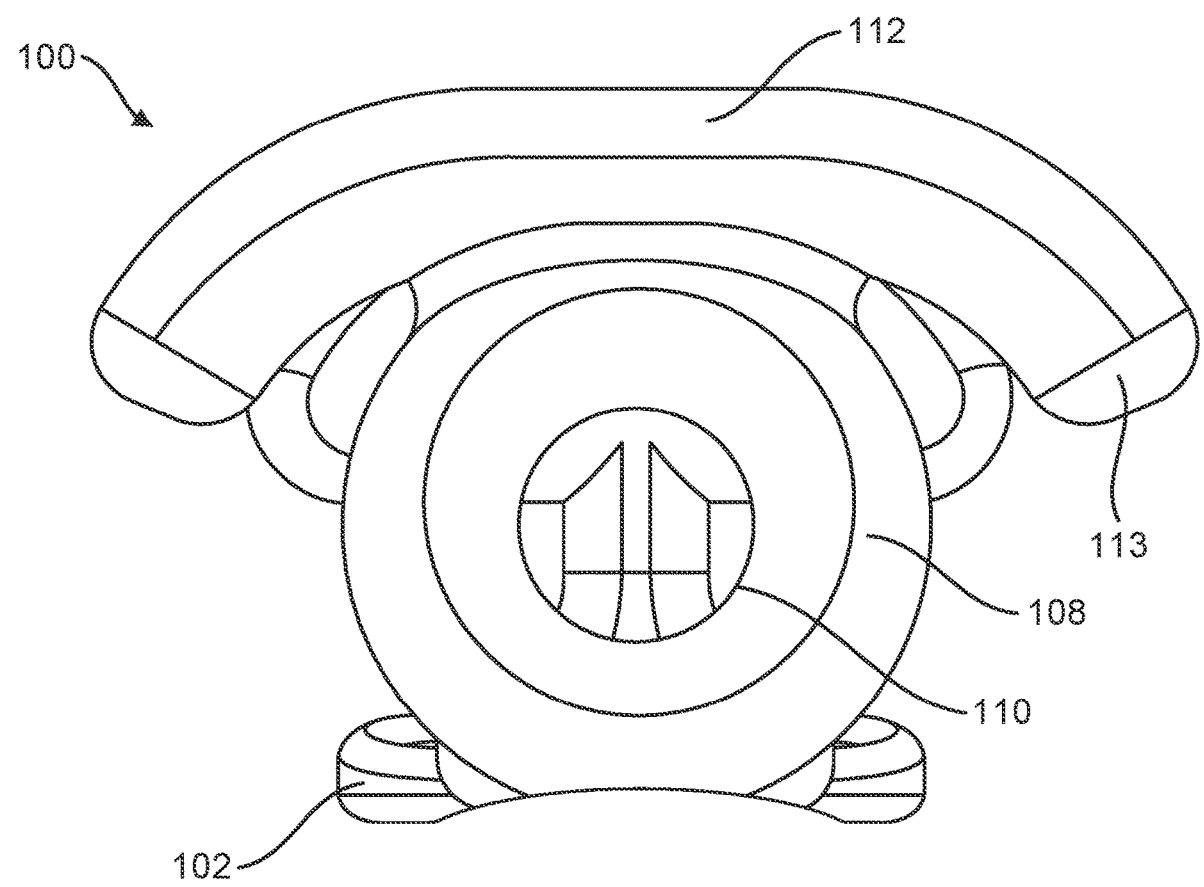
FIG. 4 depicts a back view of a lace tying device in accordance with embodiments of the invention.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the system and method of the disclosure, as represented in the Figures is not intended to limit the scope of the disclosure, as claimed, but is merely representative of possible embodiments of the disclosure.

New devices, apparatuses, and methods for the affixing and placement of footwear and clothing fasteners, such as laces, are discussed herein. In the following description, for purposes of explanation, numerous specific details are set forth in order to provide a thorough understanding of the present invention. It will be evident, however, to anyone familiar with affixing clothing and footwear that the present invention may be practiced without these specific details.

Exemplary embodiments of the invention include a novel affixing and placement device generally consisting of a torus or ring to initially pull the fasteners through, an area to wrap the fasteners to reduce the length of the fastener, and an area to affix the end of the fasteners so they maintain a given location. These various elements are configured to allow for easy operation with one hand.

In accordance with embodiments of the invention, a lace tying device 100 is provided, as illustrated in FIGS. 1-8. Referring initially to FIG. 1, the lace tying device 100 includes a base 102 having a proximal end 104 opposite a distal end 106. A first vertical section 108 is disposed at the proximate end 104 of the base 102. An aperture 110 is defined by the first vertical section 108. The first vertical section 108 may have a torus shape, as illustrated in the Figures, with aperture 110 defined in the center of said torus shape. A tie bar 112 is connected to the first vertical section 108. The tie bar 112 may include a pair of arms 113, for example, with each arm extending from the top of the vertical section 108. In some embodiments, the arms 113 may be angled down towards the base 102, which aids in retaining laces to provide grip and is less likely to catch on to a foreign object while a user is walking. A second vertical section 114 is disposed at the distal end 106 of the base 102. The second vertical section 114 defines a retention notch 116 with an opening 117. As illustrated in the Figures, the retention notch 116 is a T-shaped aperture. An anchor member 118 is disposed at the distal end 106 of the base 102. As illustrated in the Figures, anchor member 118 is a hook. In some embodiments, a plurality of lace guides 120 are disposed adjacent to the opening 117. The lace guides 120 may be hemispherical protrusions along the surface of the second vertical section 114, as illustrated, to aid a user in placing laces within the retention notch 116.

In one embodiment, the base 102 has a length 122 and a width 124, and the base is 102 is curved along the width 124. The curvature along the width 124 (i.e., bottom plane of the body) is operable to fit the curve of the top of a foot of a user, which provides additional comfort. The lace tying may further include at least one reinforcement rib 126 along a length of the body 102 to provide additional strength to the base 102. The base 102 may be approximately 40-60 mm long by 10-20 mm wide, for example.

The first vertical section 108 may be a torus shape of approximately 4 mm-6 mm wide, for example. Alternate shapes to a torus shape may be provided, including but not limited to, a loop, ring, donut, tunnel, hole, funnel, or other generally known shape that contain an aperture. The first tie bar 112 may be approximately 20-30 mm, for example.

The second vertical section 114 may be approximately 20-30 mm wide and 10-15 mm tall, for example. The second vertical section 114 may be positioned at a predetermined distance away, approximately 30-50 mm, from the first vertical section 108, for example. In some embodiments, the retention notch 116 is approximately 1-3 mm wide, having an arrangement of void spaces to serve as a friction holder for footwear and clothing fastener ends. In some embodiments, the second vertical section 114 may act as a second tie bar and the retention notch 116 may be defined by another portion of the body 102.

The anchor member 118 may be a hook, approximately 5-8 mm wide by 6-10 mm tall. During use, the anchor member 118 engages with existing fastening on footwear or clothing to position the device and create stability during operation.

Figure 5:
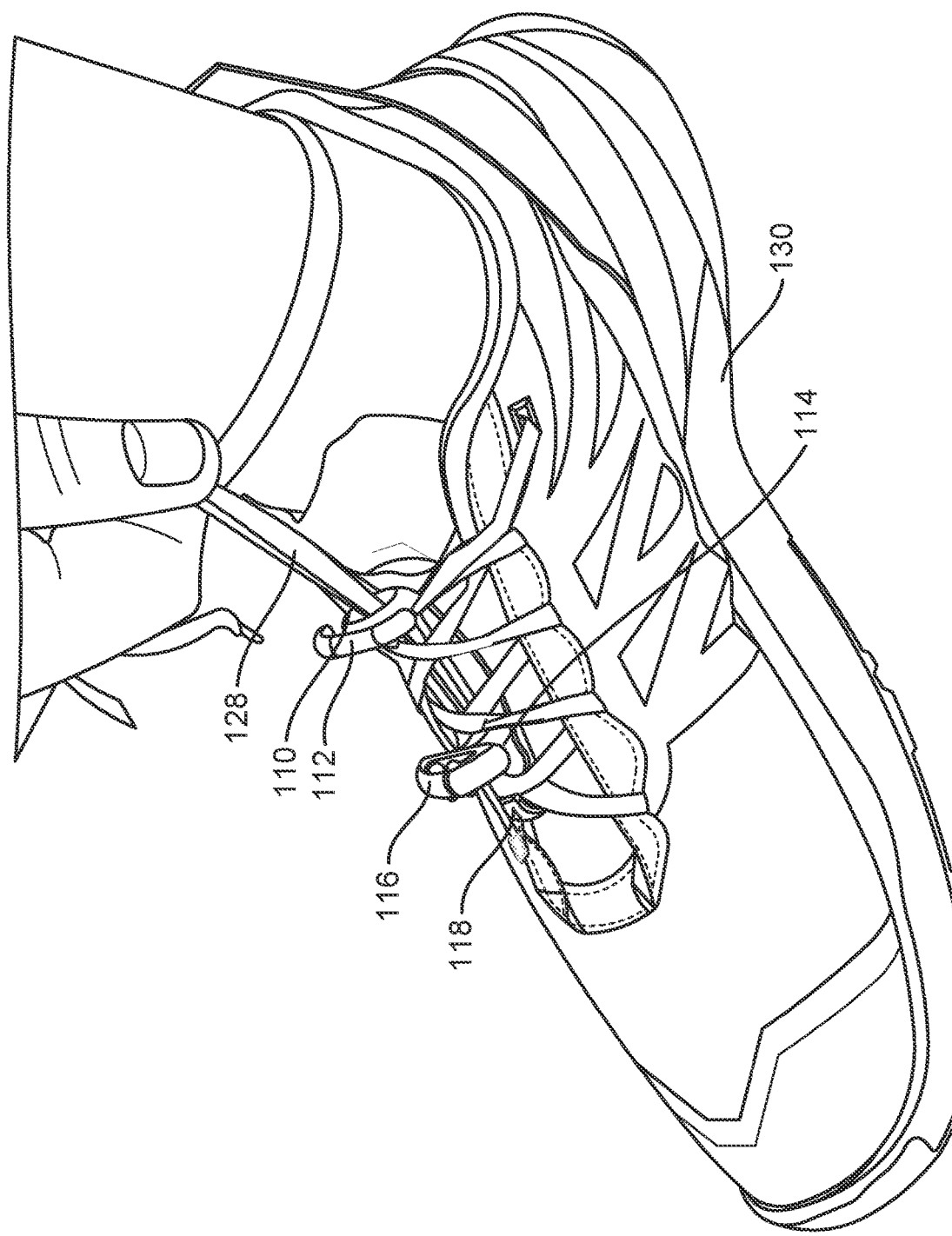
FIG. 5 depicts a perspective view of a first step of tying shoelaces using lace tying in accordance with embodiments of the invention.
Figure 6:
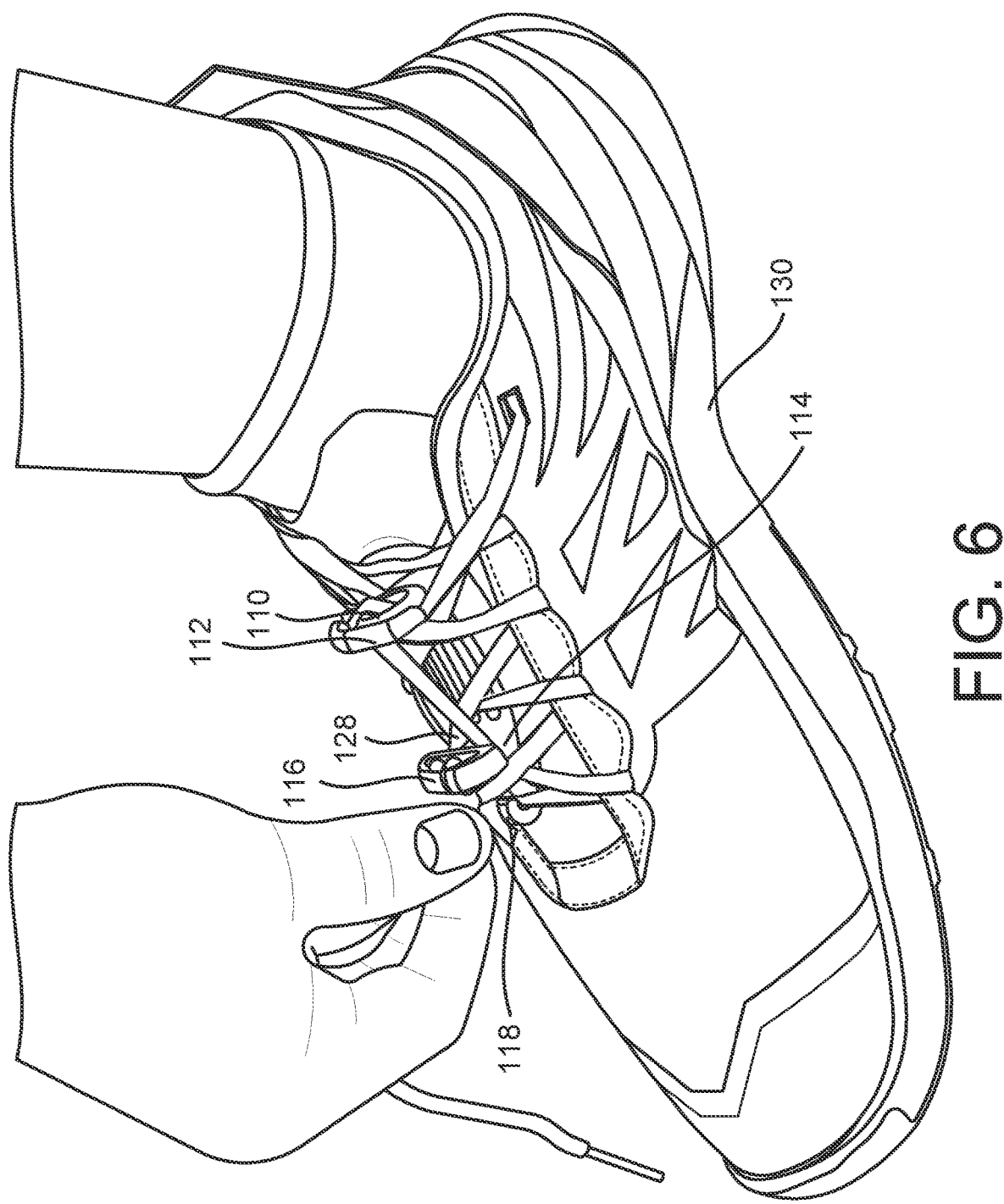
FIG. 6 depicts a perspective view of a second step of tying shoelaces using lace tying in accordance with embodiments of the invention.
Figure 7:
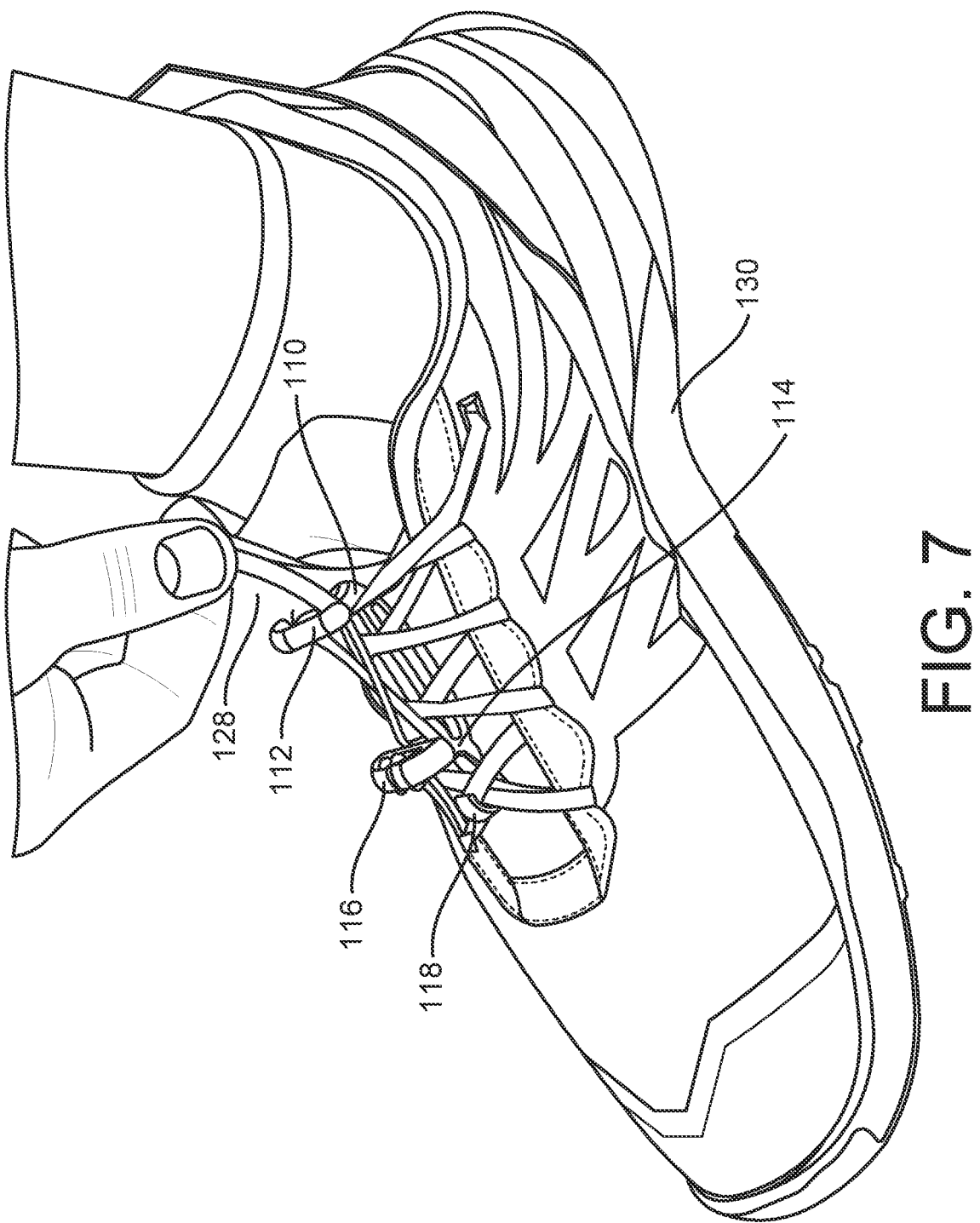
FIG. 7 depicts a perspective view of a third step of tying shoelaces using lace tying in accordance with embodiments of the invention.
Figure 8:
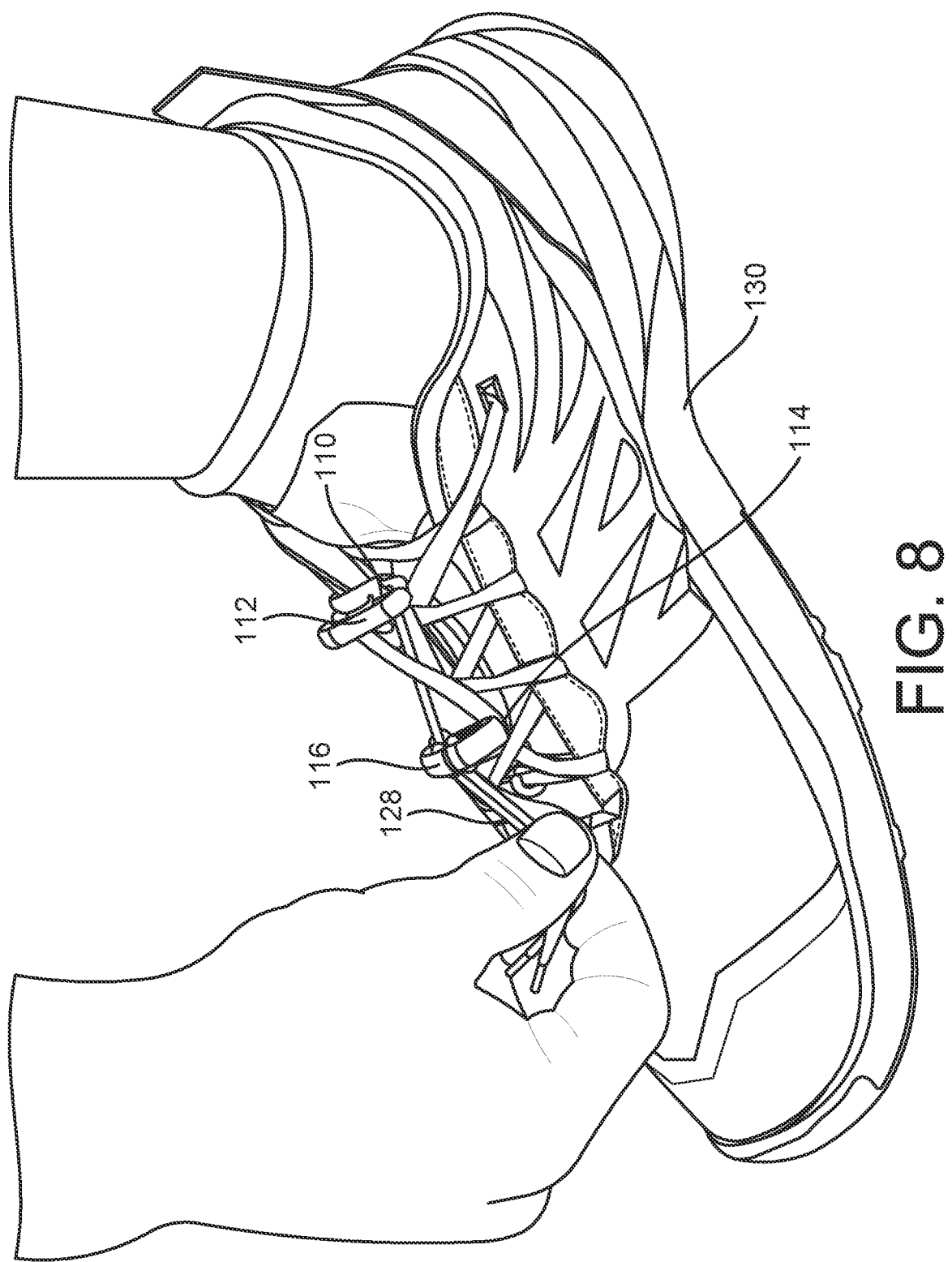
FIG. 8 depicts a perspective view of fourth and fifth steps of tying shoelaces using lace tying in accordance with embodiments of the invention.

In an exemplary method of operation, as illustrated in FIGS. 5-8, the anchor member 118 is used to position the lace tying device 100 under laces 128 on shoe 130. A user is enabled to use a single hand, for example, for a step (a) to guide the ends of laces 128 through the torus-shaped fastener aperture 110 as illustrated in FIG. 5, for a step (b) to guide the laces 128 around the second vertical section 114 as illustrated in FIG. 6, for a step (c) to guide the laces 128 around the raised tie bar 112 as illustrated in FIG. 7, for a step (d) to guide the laces 128 again around the second vertical section 114 as illustrated in FIG. 8, and for a step (e) to insert and secure the ends of the laces 128 into the void spaces of the retention notch 116 as also illustrated in FIG. 8. As illustrated in FIG. 5, the user is pulling on the laces 128 after they have been inserted through the aperture 110. This enables a user to tighten the laces 128 of a shoe with a single hand, which is particularly useful when a user has limited mobility. Further, step (d) may be repeated multiple times to wrap the laces 128 around the second vertical section 114 to shorten the length of the laces 128 that will protrude through the retention notch 116 so the laces 128 remain on top of the shoe and do not drag.

The lace tying device 100 is operable to allow for one handed operation. The arrangement of the torus-shaped aperture guide and horizontal tie bars in relation to the footwear and clothing fasteners enable one handed operation. This device is not limited by any material. Wood plastics, rubber, foam, metal allows, aluminum, and other materials may comprise some or all of the elements of the device for affixing and placement of footwear and clothing fasteners.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A lace tying device, comprising:
   a base having a proximal end opposite a distal end;
   a first vertical section disposed at said proximate end of said base;
   an aperture defined by said first vertical section;
   a tie bar connected to said first vertical section;
   a second vertical section disposed at said distal end of said base; and
   a retention notch defined by said second vertical section, said retention notch having an opening, said retention notch defining a T-shaped aperture.

2. The lace tying device of claim 1, further comprising an anchor member at said distal end of said base.

3. The lace tying device of claim 2, wherein said anchor member is a hook.

4. The lace tying device of claim 1, wherein said first vertical section is in the shape of a torus.

5. The lace tying device of claim 1, wherein said tie bar comprises a pair of arms.

6. The lace tying device of claim 5, wherein said arms are angled towards said base.

7. The lace tying device of claim 1, wherein said second vertical section comprises a horizontal portion.

8. The lace tying device of claim 1, wherein said base has a length and a width, and said base is curved along said width.

9. The lace tying device of claim 1, further comprising at least one reinforcement rib along a length of said body.

10. A lace tying device, comprising:
    a base having a proximal end opposite a distal end;
    a first vertical section disposed at said proximate end of said base;
    a first lace retention portion defined by said first vertical section;
    a tie bar connected to said first vertical section;
    a second vertical section disposed at said distal end of said base; and
    a T-shaped lace retention notch defined by said second vertical section.

11. The lace tying device of claim 10, further comprising an anchor member at said distal end of said base.

12. The lace tying device of claim 10, wherein said first lace retention portion is an aperture.

13. The lace tying device of claim 10, wherein said first lace retention portion is in the shape of a torus.

14. The lace tying device of claim 10, wherein said tie bar comprises a pair of arms.

15. The lace tying device of claim 14, wherein said arms are angled towards said base.

16. The lace tying device of claim 10, further comprising at least one reinforcement rib along a length of said body.

17. A lace tying device, comprising:
    a base having a proximal end opposite a distal end;
    a first vertical section disposed at said proximate end of said base;
    an aperture defined by said first vertical section;
    a tie bar connected to said first vertical section;
    a second vertical section disposed at said distal end of said base;
    a retention notch defined by said second vertical section, said retention notch having an opening; and
    at least one lace guide disposed adjacent to said opening of said retention notch, wherein said at least one lace guide is a hemispherical protrusion.

18. The lace tying device of claim 17, further comprising an anchor member at said distal end of said base.

19. The lace tying device of claim 17, wherein said retention notch defines a T-shaped aperture.

20. The lace tying device of claim 17, wherein said first vertical section is in the shape of a torus.

* * * * *